Nov. 10, 1959  J. R. MARKS  2,911,939
IRRIGATION WATER SIGNAL
Filed July 18, 1958  2 Sheets-Sheet 2
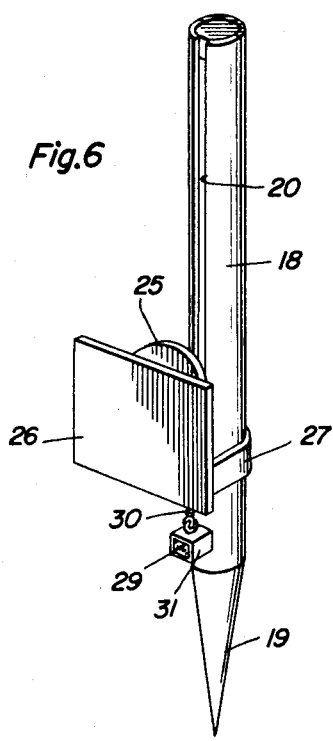
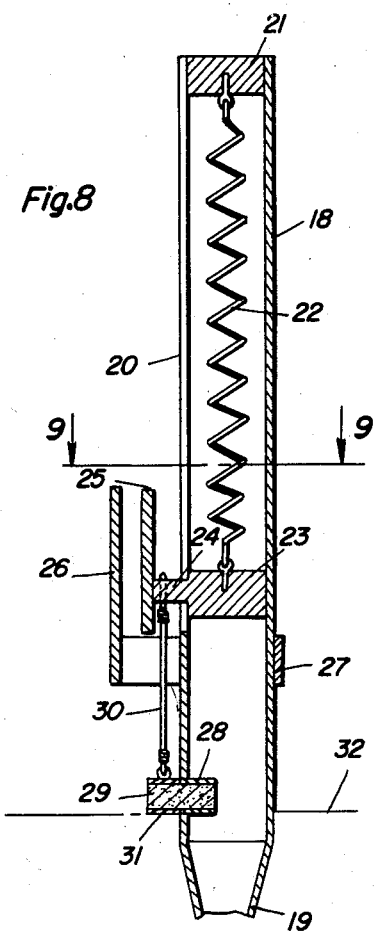
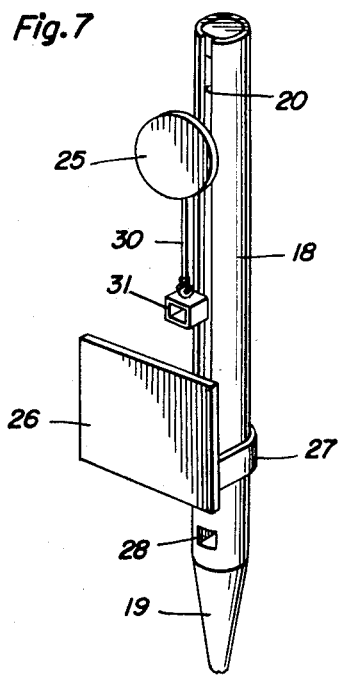
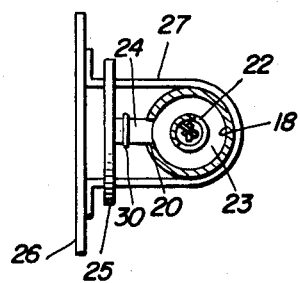
James R. Marks
INVENTOR.

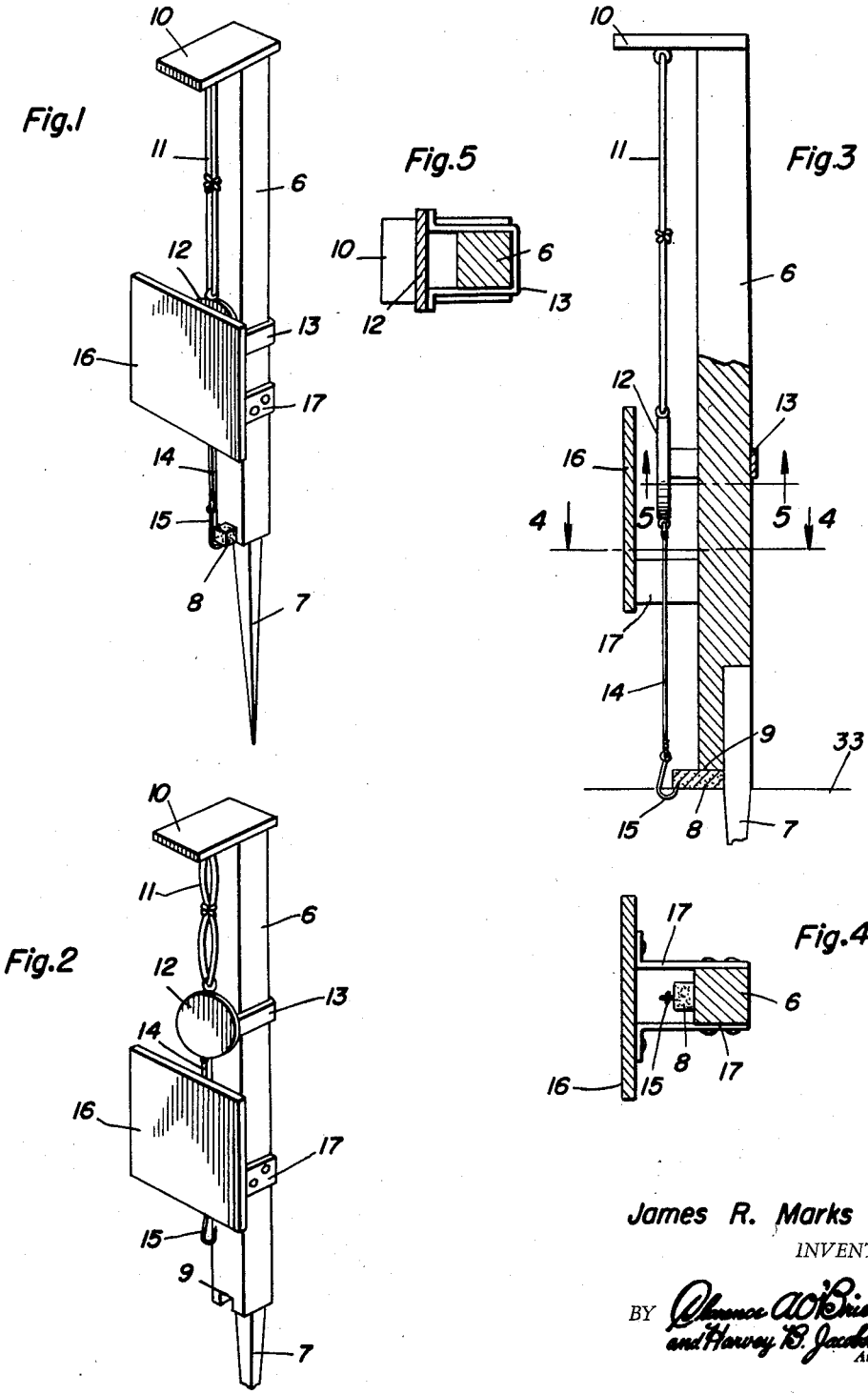

United States Patent Office 2,911,939
Patented Nov. 10, 1959

2,911,939

IRRIGATION WATER SIGNAL

James R. Marks, Merrill, Oreg.

Application July 18, 1958, Serial No. 749,372

4 Claims. (Cl. 116—118)

This invention relates to new and useful improvements in signals for use in row crop irrigating and has for its primary object to provide, in a manner as hereinafter set forth, novel means for automatically indicating to the irrigator when the water reaches the remote end of the lateral, thus enabling a single person to expeditiously perform the work without the necessity of walking back and forth between the rows.

Another important object of the present invention is to provide, in an automatic signal of the aforementioned character comprising a visual indicator, unique means, releasable by the water, for securing said indicator in a concealed or inoperative position.

Other objects of the invention are to provide an automatic irrigation water signal of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of an automatic irrigation water signal constructed in accordance with the present invention;

Figure 2 is a perspective view substantially similar to Figure 1 but showing the indicator in signalling position;

Figure 3 is a view partially in side elevation and partially in vertical section;

Figure 4 is a view in horizontal section, taken substantially on the line 4—4 of Figure 3;

Figure 5 is a view in horizontal sectional, taken substantially on the line 5—5 of Figure 3;

Figure 6 is a perspective view of a modified form of the invention, showing the device in set position;

Figure 7 is a perspective view of the modification, showing the indicator in released or signalling position;

Figure 8 is a view in vertical section through the modification; and

Figure 9 is a view in horizontal section, taken substantially on the line 9—9 of Figure 8.

Referring now to the drawing in detail, it will be seen that the embodiment of the invention which has been illustrated in Figures 1 to 5, inclusive, comprises a substantially square post 6 of wood, plastic or other suitable material. The post 6, which may also be of any suitable dimensions, has fixed in its lower end portion and depending therefrom a ground penetrating spike or stake 7 for erecting said post in the desired location. Also, fixed in the lower end portion of the post 6 and projecting forwardly therefrom is a water soluble body or block 8 which is preferably but not necessarily of sugar. A recess 9 in the lower end portion of the post 6 receives the water soluble block 8.

Fixed on the upper end of the post 6 is a forwardly projecting arm or plate 10. Depending from the arm 10 is an elastic strand or member 11 of suitable material, preferably rubber. An indicator 12 in the form of a disk of suitable material is suspended from the lower end of the elastic strand 11. Mounted on the back of the indicator 12 is a substantially U-shaped guide 13 which is slidable on the square post 6. Depending from the indicator 12 is a flexible strand 14 having connected to its lower end a hook 15 which is engageable in the soluble block or body 8.

Mounted vertically on the post 6 at an intermediate point is a substantially square shield or screen 16 of suitable material. The screen 16, which may also be of any desired dimensions, is secured on the post 6 through the medium of brackets 17 (see Figure 4).

It is thought that the use of the device will be readily apparent from a consideration of the foregoing. Briefly, the hook 15 is anchored in the soluble block 8 thus concealing the indicator 12 behind the screen 16 and tensioning the elastic strand 11. The post 6 is then erected in the desired location at the lower end of the row by inserting the spike or stake 7 in the ground, as indicated at 33. When the water reaches the lower end of the row and contacts the block 8, said block is dissolved thereby and the hook 15 is released, thus permitting the elastic strand 11 to elevate the indicator 12 above the screen 16 where said indicator may be observed by the irrigator standing at the ditch. The guide 13 retains the indicator 12 in position in front of the post 6.

In the modification of Figures 6 to 9 inclusive, of the drawing, reference character 18 designates a tubular post of suitable material comprising on its lower end an integral ground penetrating point or spike 19. The tubular post 18 has formed therein a vertical slot 20.

Fixed in the upper end portion of the post 18 is a disk or plug 21. A coil spring 22 is suspended from the plug 21. Mounted on the lower end of the coil spring 22 is a piston or plunger 23 which is slidable in the post 18. Projecting from the periphery of the piston 23 is an arm 24 which is operable in the slot 20. An indicator 25 is fixed on the outer end of the arm 24.

Mounted on the post 18 at an intermediate point is a screen 26. As shown to advantage in Figure 8 of the drawing, the screen 26 is spaced from the post 18 for receiving the indicator 25 therebetween. A substantially U-shaped bracket 27 supports the screen 26 on the post 18.

Mounted in the lower front portion of the post 18 below the slot 20, is a tubular holder 28 which is open at both ends. The holder 28 is for the reception of a body or block 29 of sugar or other suitable water soluble material. As best seen in Figure 8 of the drawing, the soluble block 29 is inserted in the holder 28 in a manner to project forwardly therefrom. A flexible strand or cord 30 is suspended from the arm 24. Mounted on the lower end of the strand 30 is an anchoring sleeve 31 of rectangular cross-section which is adapted to be slipped on the projecting end portion of the soluble block 29 for securing the indicator 25 in lowered or set position behind the screen 26 against the tension of the coil spring 22.

In use, the soluble block 29 is mounted in the holder 28 and the sleeve 31 is slipped on the projecting end portion of said block for anchoring the indicator 25 in lowered or set portion behind the screen 26 against the tension of the spring 22. The post 18 is then inserted in the ground at the lower end of the row with the soluble block 29 substantially at ground level, as indicated at 32. Thus, when the water reaches the lower end of the row and contacts the block 29, said block is dissolved. In this manner the indicator 25 is released and the coil spring 22 elevates said indicator to signalling position above the screen 26 as shown in Figure 7 of the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An irrigation water signal comprising a post, an indicator mounted for vertical sliding movement on said post and having a signalling upper position and a non-signalling lower position, a screen mounted on the post for concealing the indicator in non-signalling position, a resilient member suspended from the upper portion of the post and connected to the indicator for yieldingly urging same to signalling position, a water soluble element mounted on the lower portion of the post, and a flexible strand connecting the indicator to said element for releasably anchoring said indicator in non-signalling position against the tension of said resilient member.

2. An irrigation water signal comprising a post, an arm on the upper end portion of said post, an indicator mounted for vertical sliding movement on the post and having a signalling upper position and a non-signalling lower position, a screen mounted on an intermediate portion of the post and spaced therefrom for receiving therebetween the indicator and concealing same in non-signalling position, an elastic strand suspended from the arm and connected to the indicator for yieldingly urging same to signalling position, a water soluble element mounted on the lower end portion of the post, a non-elastic strand suspended from the indicator, and a hook on the lower end of said non-elastic strand engageable with said element for releasably anchoring said indicator in non-signalling position behind the screen against the tension of said elastic strand.

3. An irrigation water signal comprising a tubular post having a vertical slot therein, a member slidable vertically in said post and operable in the slot, an indicator on the member exteriorly of the post and having a signalling position and a non-signalling position, a spring in the post connected to the member for yieldingly urging the indicator to signalling position, a water soluble element mounted on the post, and means connecting the indicator to said element for releasably anchoring said indicator in non-signalling position against the tension of the spring.

4. An irrigation water signal comprising a tubular post having a vertical slot therein, a piston slidable in said post, an arm on said piston operable in the slot, an indicator on said arm having a signalling position and a non-signalling position, a screen on the post for concealing the indicator in non-signalling position, a coil spring in the post suspended from the upper portion thereof and connected to the piston for yieldingly urging the indicator to signalling position, a water soluble element on the lower portion of the post, and a flexible strand connecting the indicator to said element for releasably anchoring said indicator in non-signalling position behind the screen.

References Cited in the file of this patent
UNITED STATES PATENTS

| | | |
|---|---|---|
| 2,591,037 | Adams | Apr. 1, 1952 |
| 2,681,032 | Shaw | June 15, 1954 |
| 2,740,371 | Nelson | Apr. 3, 1956 |